Patented Feb. 6, 1934

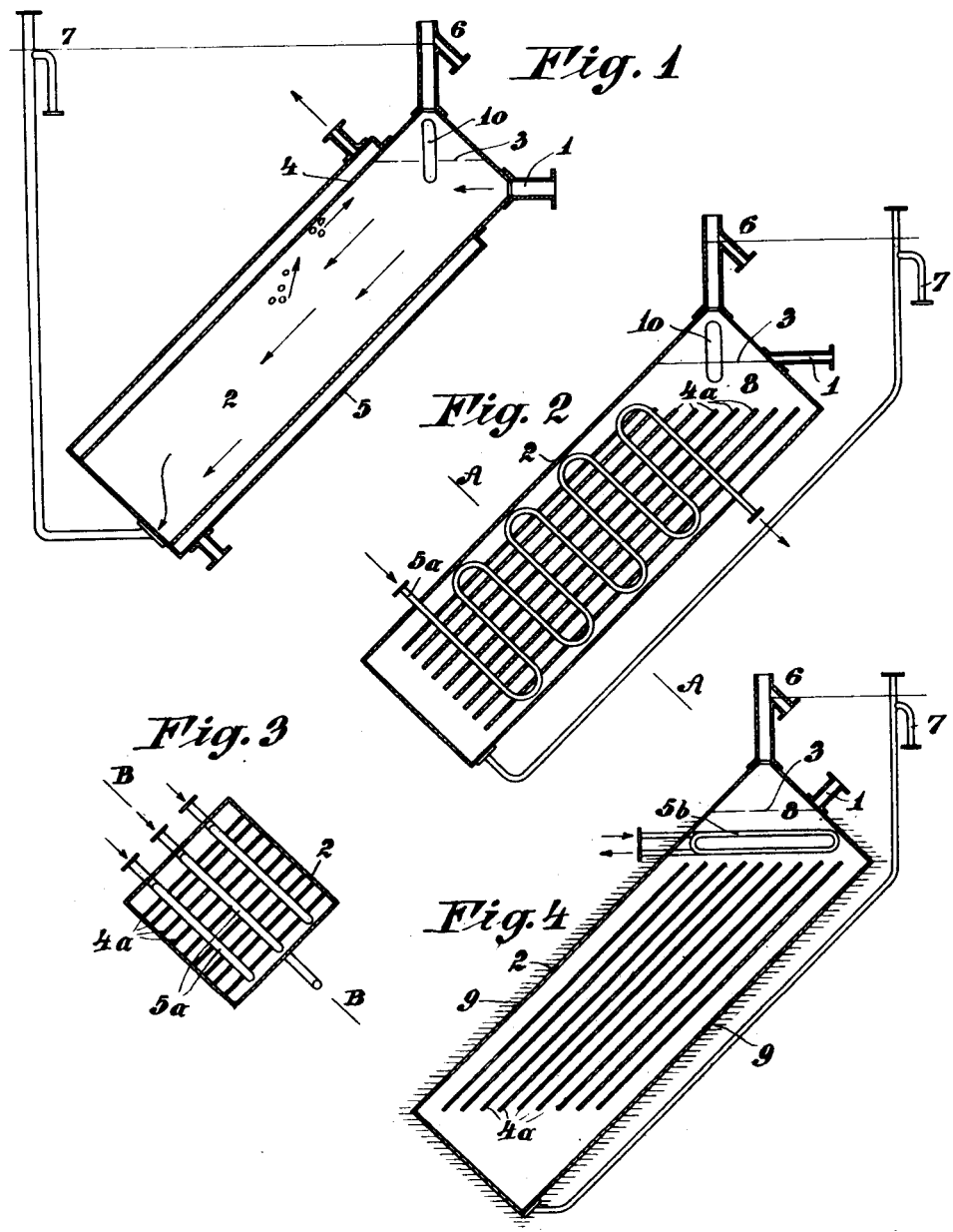

1,946,415

UNITED STATES PATENT OFFICE 1,946,415

PROCESS FOR THE CONTINUOUS SEPARATION OF NITROGLYCERINE AND RESIDUARY ACID

Arnold Schmid, Burbach, Germany; Hans Schmid and Irma Schmid, administrators of said Arnold Schmid, deceased, assignors to Karl Schmid, Mannheim, Germany Application July 18, 1929, Serial No. 379,293, and in Germany July 30, 1928

1 Claim. (Cl. 260—144)

This invention relates to a process for the continuous separation of nitroglycerine and residuary acid.

A process of this kind is already known in which the liquid is divided into a number of layers by arranging plates in the separators, so that the process is accelerated considerably.

The present invention relates to a considerably improved process of separation compared with the known process, in which latter the differences in the specific weights between the supplied and discharged mixtures are not taken into consideration and therefore the result is not quite satisfactory.

In the known apparatus in spite of the arrangement of perforated distributing plates, the considerably lighter emulsion of nitroglycerine and residuary acid immediately on its admission ascended in the heavier acid-charge and passed through the vessel between the uppermost plates, while the heavier acid remained in the bottom part of the separator and did not circulate.

In this way only a part of the separation receptacle is actually utilized for the process of separation, while in the other part of the separator the residuary acid constitutes an unnecessary charge only, and consequently the separation carried out in an apparatus of this kind is very unsatisfactory and the discharged residuary acid contains much more nitroglycerine in suspension than would be the case if the liquid actually had been distributed over the whole receptacle. In view thereof it has been necessary to carry out the separation and after separation in separate apparatuses, so that the said separator has been employed for the after separation only. In this event better results were obtained, because such a great difference in the specific weight of the supplied liquid and the discharged liquid no longer existed; but also in this case the process was not quite satisfactory.

Namely small differences in density of the liquids arose by differences of temperature and again influenced the course of the circulation in an undesirable manner. When the warmer residuary acid entered the colder after separator, the admitted acid ascended immediately and displaced only the top half of the charge of the receptacle, while the bottom half again remained unchanged. When the colder residuary acid entered the warmer after separator the opposite action took place of course, namely the heavier cold acid descended immediately to the bottom and displaced only the bottom half of the contents of the apparatus.

All these drawbacks are avoided according to the present invention in that the principle of the horizontal flow of the acid in the separator is replaced by the principle of the inclined flow of the acid. The entering residuary acid always will be warmer than the residuary acid leaving the separator, if the nitrating temperature is so high, that it always lies above the temperature of the chamber in which the separation is carried out or if the separator is provided with a cooling arrangement (jacket or coil) so that its temperature always is lower than the nitrating temperature. Now if the acid flows through the separator not horizontally but from the top to the bottom, it is quite certain that the warmer and thus lighter acid cannot descend to the discharge opening located at the bottommost place of the apparatus without displacing the colder and thus heavier acid. In this way the acid-current is distributed over the whole cross-sectional area of the separator without the necessity of mechanical means such as sieves and the like.

Several modes of carrying out the present invention are illustrated diagrammatically and by way of example on the accompanying sheet of drawings in which:—

Fig. 1 shows an apparatus in longitudinal section.

Figs. 2 and 3 show a modified construction of the apparatus in longitudinal section and transverse section respectively.

Fig. 4 is a longitudinal section of a still further modified construction.

In the apparatus shown in Fig. 1, the emulsion consisting of nitroglycerine and residuary acid is admitted into the receptacle 2 by way of an inlet pipe 1. The mixture is heavier than the nitroglycerine located at the top and lighter than the residuary acid disposed at the bottom and therefore immediately distributes itself at the zone of separation 3 in the form of a horizontally disposed layer. During the downward flow of the acid, the nitroglycerine drops rise therefrom, are separated at the top wall 4 of the receptacle and now slide upward. The acid gradually becomes heavier owing to the loss of nitroglycerine and the cooling action of a cooling jacket 5. Thus always a lighter layer rests on a heavier layer, so that a uniform flow or circulation is safeguarded. The overflow pipe 6 for the nitroglycerine and the overflow pipe 7 for the acid are of such a height with respect to each other, that the separation-level remains at 3, an observation window 10 being provided at this height and the separated nitroglycerine and the residuary acid automatically leave the apparatus.

The cooling jacket can be dispensed with if the temperature of the room is lower than the temperature of the incoming emulsion. On the other hand, the said cooling jacket can be replaced by an interior cooling coil or by a thermic insulation of the receptacle. The apparatus may be provided with plates in known manner. An arrangement of this kind is shown in Fig. 2 in longitudinal section according to the line B—B of Fig. 3, and in Fig. 3 in transverse section according to line A—A of Fig. 2. It is new to arrange the plates 4ª at a gradient of between 30 and 60 degrees. The slope is now in the direction of flow of the liquid and not vertically thereto as heretofore. In this way the acid passes between the plates during its descent.

Compared with the known constructions, the greater gradient of the plates of the apparatus herein set forth possesses the further advantage, that the nitroglycerine slides up the same far quicker and sediments cannot collect on the plates, because they would slide off owing to gravity and are carried out of the apparatus by the residuary acid. The plates may be corrugated or grooved at the bottom side as it is already the case in known constructions, in order that the nitroglycerine drops more readily combine and rise.

A further novel feature of this construction consists in the arrangement of a space 8 above the plates 4ª which serves as preliminary separator, because in this space the greater part of the nitroglycerine is separated from the emulsion, so that only a very small part thereof passes with the acid between the plates. This possesses the advantage, that the process of separation and the separation-level can be watched through a window 10 and the emulsion is distributed over the entire cross sectional area of the receptacle. Otherwise the apparatus works in the same way as it has been described with reference to Fig. 1.

The coils may be dispensed with under certain circumstances. Also their number and arrangement may be varied, but care is to be taken, that the entire area of the receptacle is uniformly cooled. If some layers between the plates are more cooled than other layers, the downward flow will be accelerated in the colder layers owing to the increasing density of the acid, so that the uniformity of flow and thus the good effect of the separator are lost again.

Compared with the arrangement shown in Figs. 2 and 3, the apparatus shown in Fig. 4 differs in the arrangement of the coil and possesses the advantage of simple construction. In this arrangement the coil 5 is located in the upper preliminary separation space 8 and uniformly cools the whole area of the receptacle. However it is necessary to line the receptacle 2 against absorption of heat by an insulating material 9, in order that upwardly directed currents cannot arise at the walls in consequence of heating, which would result in too rapid movement of the suspended nitroglycerine present in the middle of the apparatus. Otherwise the operation of the apparatus is the same as in the construction according to Fig. 1.

I claim:—

Process of separating an emulsion of nitroglycerine and residuary acid which consists in continuously introducing into the upper portion of a quiescent inclined column of liquid the emulsion at a temperature higher than that prevailing in the column of liquid, whereby the emulsion cools during descent causing the nitroglycerine to separate into drops which ascend vertically and collect in the upper portion of the column and the separated acid descends to the lower portion of the column, and continuously drawing off the separated products.

ARNOLD SCHMID.